Sept. 15, 1959 A. J. MONACK 2,903,826

METHOD OF MAKING AN ELECTRODE STRUCTURE

Filed July 26, 1954 3 Sheets-Sheet 1

ALBERT J. MONACK
INVENTOR.

BY Raymond P. Wallace
ATTORNEY

Sept. 15, 1959 A. J. MONACK 2,903,826

METHOD OF MAKING AN ELECTRODE STRUCTURE

Filed July 26, 1954 3 Sheets-Sheet 2

ALBERT J. MONACK
INVENTOR.

BY Raymond P. Wallace
ATTORNEY

Sept. 15, 1959 A. J. MONACK 2,903,826

METHOD OF MAKING AN ELECTRODE STRUCTURE

Filed July 26, 1954 3 Sheets-Sheet 3

ALBERT J. MONACK
INVENTOR.

BY Raymond P. Wallace
ATTORNEY

United States Patent Office 2,903,826

Patented Sept. 15, 1959

2,903,826

METHOD OF MAKING AN ELECTRODE STRUCTURE

Albert J. Monack, Rutherford, N.J., assignor to Mycalex Electronics Corporation of America, Clifton, N.J., a corporation of New York Application July 26, 1954, Serial No. 445,873

7 Claims. (Cl. 49—81)

The present invention relates to terminal connections for electrical apparatus, and more particularly to metal terminals and insulating materials combined to form a substantially gas-proof seal, and to the method of making such seals. Terminal structures of this type are adapted for many uses, such as in radio transformers, capacitors, crystal holders, and the like, where it is desired to hermetically seal the lead-in connection.

This application is a continuation-in-part of my copending application Serial Number 193,352, filed November 1, 1950, now abandoned which is a division of my application Serial Number 582,397, filed March 12, 1945, now abandoned.

In the prior art such terminal connections had been made by the use of glass as the insulating material in which the lead-in element was sealed. It was possible to obtain a good seal by such materials, but the structure was brittle because of the glass, and if the apparatus was subject to mechanical shock the glass tended to crack and thus destroy the hermetic seal. Thermal shock was equally bad, owing to the differences in coefficients of thermal expansion between glass and metals. Either the glass cracked under thermal shock, or pulled away from the metal where perfect wetting had not been achieved in manufacture, thus in both cases again destroying the seal. The use of ceramic materials, such as porcelain, in order to make a seal, has also been suggested. However, such materials were unsuitable since they were often porous, they were but little better than glass in resisting mechanical shock, they did not unite well with the surface of the metal, and no common metals would match the expansion coefficient of porcelain or withstand the high temperature of firing.

An advance in the art was made with the patent to Goldsmith, Number 2,429,955. Goldsmith uses glass-bonded mica as his sealing insulating material; the adjacent surfaces of a conductor and a surrounding bushing are first given a ground coat, then a coat of vitreous enamel, a mixture of powdered mica and glass is placed between them, and subjected to sufficient heat to render it plastic and sufficient pressure to unite it to the enamel.

Goldsmith, however, requires that his lead-through terminal and its surrounding bushing first be given a ground coat, then a coat of vitreous enamel, in order to insure that the glass-bonded mica sealing material will adhere; adhesion is produced by then heating the assembly under pressure.

The present invention obviates the necessity for enameling the lead-through and the bushing by using metal parts previously prepared to a suitably oxidized surface; and avoids the necessity of loading the bushing with a powdered compound by employing prefabricated injection-molded glass-bonded mica beads. Thus the present device and the process of making it are adapted to high-speed machine production. The lead-through pin, hollow bead, and bushing are loaded concentrically into rotating molding heads, the assembly is heated selectively as described below, and then compressed by a pressure die, allowing it to cool under pressure. The metal of the bushing is chosen to have a coefficient of expansion that allows it to compress the glass-bonded mica as it cools, and the metal of the pin is chosen to have a coefficient of expansion such that it will be compressed by the insulating material. Thus a tight, unitary structure is formed. This process is not only faster than that of Goldsmith previously described, but produces sealing material of better sealing qualities and a greater degree of uniformity, thus reducing the number of rejects.

It is therefore among the objects of the present invention to overcome the difficulties and disadvantages of prior structures, and to provide a lead-in structure which is simple and effective in producing the desired sealing effect.

It is another object of this invention to provide a structure of the type described wherein the insulating material is a molded composition of powdered mica and an inorganic binder.

A further object is the provision of a lead-through device in which the several elements have coefficients of expansion so chosen that adherence between the elements is greatly increased, thus increasing the efficiency of the seal.

Yet another object of the present invention is to provide an insulating structure which is relatively immune to mechanical and thermal shock.

A still further object is the provision of an insulating structure wherein the seal between metal and insulating material will not crack when used with evacuated chambers.

It is a yet further object of the present invention to provide a novel, rapid, and inexpensive method of producing insulated sealing devices.

Other objects and advantages of this invention will appear from the specification, taken in connection with the accompanying drawings.

In practising the present invention, there is provided an electrically conducting contact element or lead-through, which may be in the form of a pin, bar, strip, or other convenient shape. There is also provided a metal sleeve or eyelet, surrounding the pin but spaced therefrom. In said space there is introduced, preferably by a molding operation, an insulating composition which is a mixture of comminuted mica and any inorganic binder which has a relatively low softening or melting point. Among the binders which have been found suitable for the purpose are borates of various kinds, usually lead borates, borosilicates, or mixtures of lead borates with borates of alkaline metals. For an insulating material to withstand higher temperatures it is possible to use comminuted synthetic mica, which has a higher melting point than natural mica, and a binder of another synthetic mica having a lower melting point than the first.

It is possible to introduce such a mixture raw into the space between pin and sleeve, heat the mixture in place, and subject it to pressure until hardened. However, better adhesion of the insulating composition to the metal parts, and hence a better seal, is obtained by first making a bead of the insulating mixture in an injection mold at a temperature high enough to fuse the borate or other glassy substance, but not high enough to calcine the mica. By the process herein to be described, this bead of glass-bonded mica is then placed in the sleeve surrounding the lead, heated to its softening point, and re-compressed to attain a composition of superior insulating properties, and a high degree of adhesion, thus making a perfect seal.

It is an essential feature of the novel electrode structure that the coefficients of thermal expansion of the three elements of the structure be specifically correlated. The metal of the eyelet or sleeve is selected so that it has a coefficient of expansion at least equal to, and preferably greater than, the coefficient of the molded insulating material. The metal of the lead-through is selected to have a coefficient of expansion no greater, and preferably less than, the coefficient of the glass-bonded mica, especially over a certain critical range of temperature hereinafter described.

In the accompanying drawings, in which like numerals indicate like parts,

Figure 1:
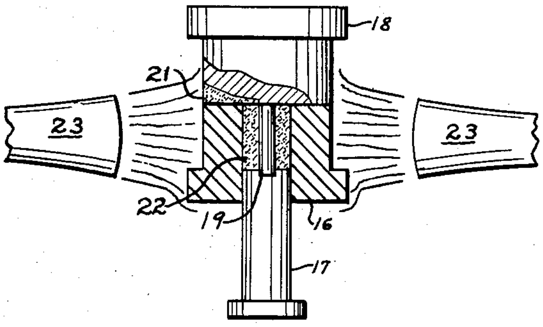
Fig. 1 is an elevational view, partly in section, of an injection-molding apparatus for making glass-bonded mica beads.

Referring more particularly to Fig. 1, there is provided a lower mold element 16 of tool steel or other suitable high temperature material, having a central mold cavity in which a knockout pin 17 is adapted to longitudinal travel. An upper mold element 18 of similar material closes the mold cavity, and bears an axial, downwardly protruding pin 19 extending centrally throughout the depth of the mold cavity and seating in a recess in the knockout pin. A runner and gate section 21 is provided in upper element 18. In operation, the two mold elements are positioned in a mold-frame (not shown) adapted to hold the elements tightly together or to retract them to allow extraction of the molded piece; the frame may be adapted for a single cavity, or for a plurality of cavities.

A mixture is prepared of comminuted mica, either natural or synthetic, and powdered frit of a suitable glassy material or other inorganic binder. In practice it has been found convenient to choose a glassy component having suitable softening, or working range, between 900° F. and 1220° F., for example, with a preferred working temperature of about 1150° F., although the invention is not limited to compounds which are fluid at these temperatures. The mixing is brought to a suitable injection temperature, producing a molten mass of comminuted mica suspended in, and in partial solution with, the glassy component. This mass is injected into the runner of the closed mold at high pressure, thus filling the cavity above the knockout pin and producing a cylindrical bead 22. The injection pressure may be any adequate amount for making a solid, dense molding; in practise, a pressure of about 400 pounds per square inch or higher has proved satisfactory.

When working with a composition having an injection temperature in the above range, the mold is kept at a temperature between 400° F. and 750° F., with a preferred temperature of about 680° F.; flame nozzles 23 are provided to maintain mold temperature. Working within the ranges given, it is possible to inject a highly fluid mass, thus completely filling the cavity; the mold is maintained at such a temperature as to allow almost instantaneous cooling to a solid state, yet not so cold as to subject the bead to thermal stresses, and not so hot as to cause the insulating composition to stick to the mold. When the bead is frozen, upper mold element 18 is retracted and the bead ejected from the cavity by upward action of the knockout pin. The runner which remains attached to the bead may be broken off or ground off, as may be dictated by the required degree of finish.

Figure 2:
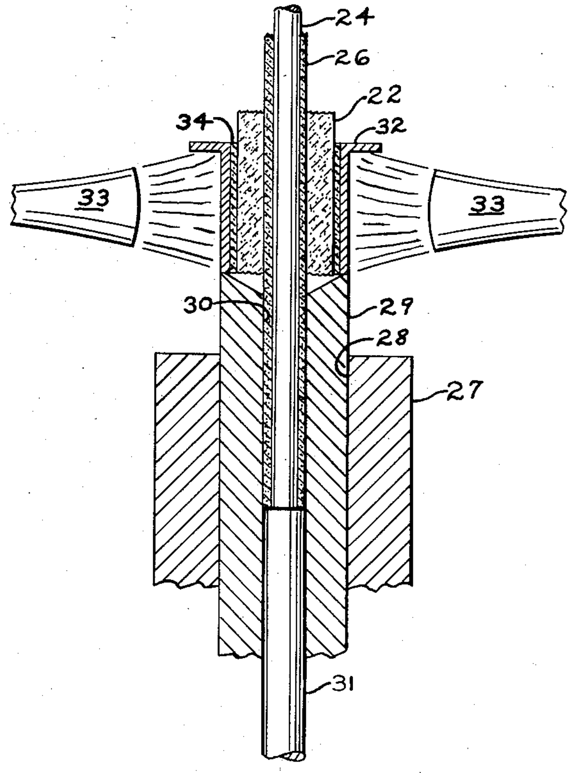
Fig. 2 shows apparatus and one stage of the process for making the novel seal.

Turning now to Figure 2, there is shown a step in the process of the actual assembly of the pressure-tight lead-through structure. There is provided a pin 24 of suitable composition, length, and diameter, which has preferably been previously oxidized to give it an oxide coating 26 (exaggerated in the drawing) in the manner now to be described. One satisfactory pin material has been found to be that sold under the trade name of "Sylvania #4," composed approximately as follows, it being understood that small variations, especially in the minor components, are permissible:

| | | |
|---|---|---|
| Nickel | percent | 42.00 |
| Chromium | do | 0.29 |
| Manganese | do | 0.29 |
| Silicon | do | 0.12 |
| Carbon | do | 0.04 |
| Aluminum | | Trace |
| Iron | | Balance |

Pins of such material are oxidized by the wet hydrogen process, that is, maintained for approximately twenty minutes at about 2300° F. in an atmosphere of hydrogen containing about 5% water vapor; this procedure coats the metal with a thin, highly adherent layer of $Cr_2O_3$, which is readily wet by glassy materials, and which prevents the formation of other, undesirable oxides. Many other metals containing chromium in various amounts and having suitable rates of thermal expansion have also been found satisfactory when oxidized by the wet hydrogen process; nickel and nickel-iron alloys which have satisfactory coefficients of expansion may also be used without wet hydrogen oxidation, forming iron and nickel oxides during the manufacturing process which may be wet by glassy materials.

A rotatable head 27 having an axial cavity 28 is provided with a first plunger 29 adapted to travel vertically in the said cavity; plunger 29 is provided with an axial bore 30 for a second plunger 31, the bore being of such diameter as to receive pin 24 with easy clearance. Plunger 29 has its upper end provided with a countersink adapted to shape one end of the insulating material in a conical form, which increases the leakage path between pin and sleeve, and also forces the insulation very tightly against the pin at this portion, thereby contributing to good sealing. With both plungers in retracted position, a thin-walled eyelet or sleeve 32, which may have its upper end flanged is loaded into cavity 28 with its lower end resting on the upper end of plunger 29 (better shown in Figure 4). A pin is inserted into the sleeve, its lower end entering bore 30 and seating on the top of plunger 31, whereby it is retained substantially on the axis of the sleeve. Next a bead 22, of somewhat greater length than the sleeve, is dropped over the pin and into the sleeve, its lower end also seating against plunger 29.

Plunger 29 is then raised above the surface of head 27, which may be rotated, and flames from nozzles 33 are played against the assembly of sleeve, bead, and pin. The said assembly is thus raised to a temperature of about 1210° F. to 1230° F., and preferably 1220° F., for a brief period ranging from 20 seconds to 1 minute, and preferably about 35 seconds. During this period an oxide coating 34 forms on the inner surface of the sleeve (and also, not shown, on the outer surface), which oxide is readily wetted by the glassy component and unites therewith. The temperature and time of heating are such as not only to render the binder fluid, but also to cause slight calcination of the mica, with the formation of minute bubbles, which bubbles have an important function later to be described. As the binder becomes fluid, it wets the sleeve and pin and causes sufficient adhesion to support its weight.

Figure 3:
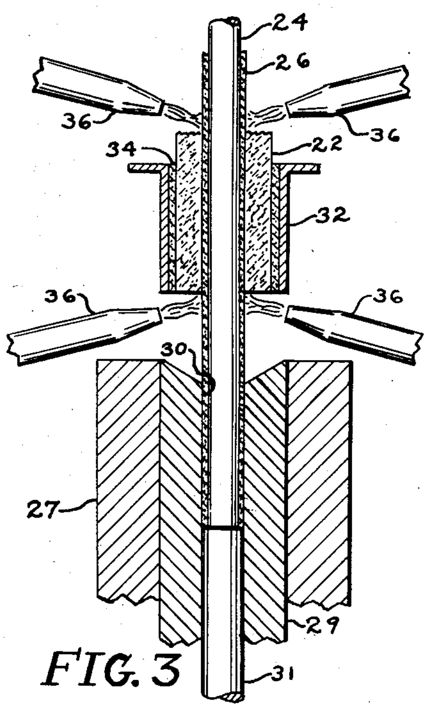
Fig. 3 shows apparatus and another stage of the process.

Plunger 29 is then retracted (shown in Figure 3), leaving the lower end of the pin retained in bore 30 and standing on the upper end of plunger 31. Flame nozzles 36 are then allowed to play sharp flames on the upper and lower portions of the pin adjacent to the ends of the bead, heating it to a temperature substantially in the range of 1210° F. to 1230° F., and again preferably 1220° F., causing the binder to wet the pin thoroughly and adhere closely to it.

Figure 4:
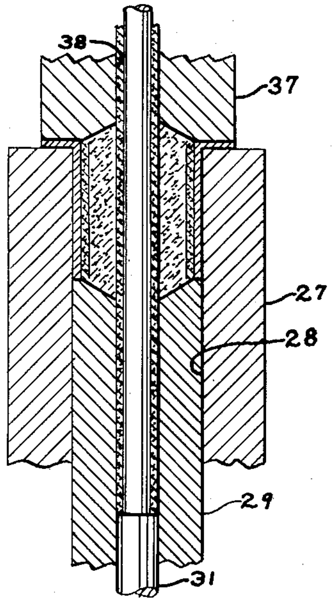
Fig. 4 shows apparatus and the final stage of making electrode structure.

As shown in Figure 4, both plungers are then dropped to rest position, returning the electrode assembly to cavity 28, the assembly then being struck by an upper die 37, having an axial bore 38 to receive the upper end of the pin and a countersink to shape the upper end of the insulating material. The strike by die 37 recompresses the insulating material, shapes its ends, and forces it into intimate contact with pin and sleeve, completing the assembly of the electrode structure. Satisfactory pressure for this operation has been found to be between seven and fifteen pounds per square inch, with the optimum about ten pounds per square inch. The structure is allowed to cool in the compressed position, which cooling is substantially instantaneous; it is then ejected by retracting the upper die and raising plunger 29. If desired, the product may be annealed in order to relieve strains which may have been introduced during the molding operation.

Figures 5, 6:
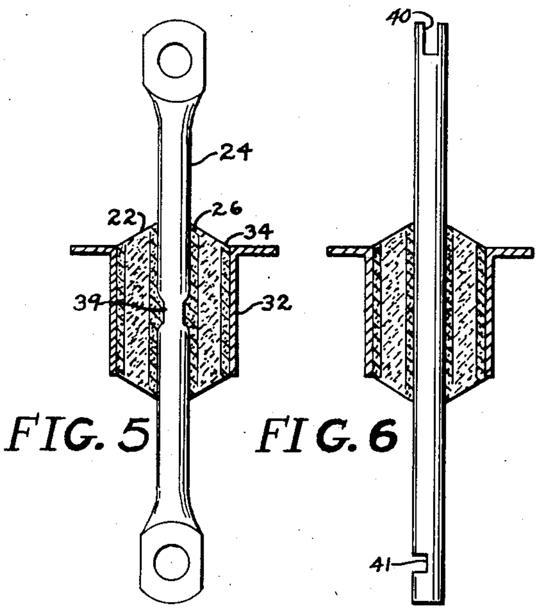
Fig. 5 is a longitudinal cross-section of one embodiment of the new electrode structure.
Fig. 6 is a similar section of another embodiment.

Referring now to Figure 5, there is shown a completed electrode structure made according to the foregoing procedure. In this embodiment the ends of the pin have been stamped or swaged to a flat section, which section may then be punched or drilled to allow electrical connection of a wire thereto. In this embodiment and other similar ones, the oxide coating is preferably removed from the protruding portions of the central lead.

Although it has been found entirely satisfactory to make the electrode structure with a straight pin therethrough, for increased mechanical retention of the pin in the insulating material, it is possible to configure that portion of the pin which is embedded so that it forms a positive maechanical lock; for this purpose the portion of the pin enclosed within the insulating compound may be flanged, grooved, shouldered, knurled, or otherwise shaped to insure good anchorage. It is also equally possible to shape the sleeve element in such a manner that the insulating material is locked therein.

Figure 7:
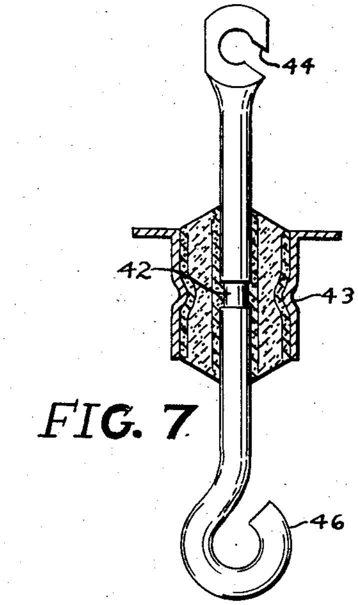
Fig. 7 is a similar section of a third embodiment.

Figure 5 shows an embodiment in which the pin 24 has been given an upset 39 at the embedded portion, by striking that section of the rod between a pair of anvils previous to assembly. In Figure 6, the ends of the pin are provided with transverse slots 40 and 41, as an alternate method of making a wire connection. Figure 7 shows an embodiment wherein the center portion 42 of the pin has been turned down to a smaller diameter and a circumferential groove 43 has been rolled into the barrel, reducing the diameter of the central portion thereof. One end of the pin has been stamped flat, punched, and a slot 44 cut through the flat section to the punched hole; the other end has been formed into a hook 46.

Figures 8, 9:
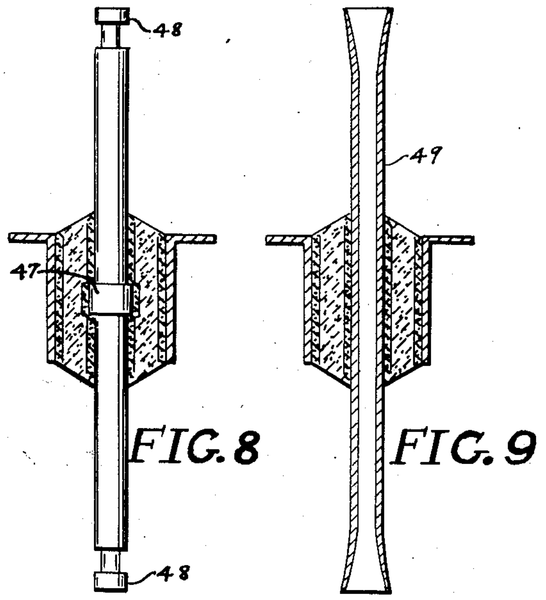
Fig. 8 is a similar section of a fourth embodiment.
Fig. 9 is a similar section of a fifth embodiment.

In Figure 8 there is provided an embodiment wherein the embedded portion of the pin has an enlarged boss or flange 47, and the ends of the pin are provided with turret heads 48; nail heads may also be provided. Figure 9 shows an embodiment in which the center lead-through is a tube 49, which may have its ends swaged to a larger diameter as shown; such a tube allows easy insertion of a wire, which may pass entirely through the tube, or which may be separate wires soldered into each end of the tube.

Figure 10:
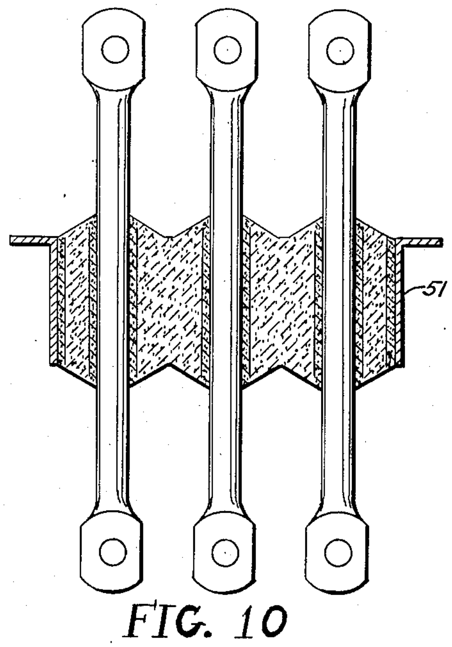
Fig. 10 is a similar section of a plural embodiment.
Figure 11:
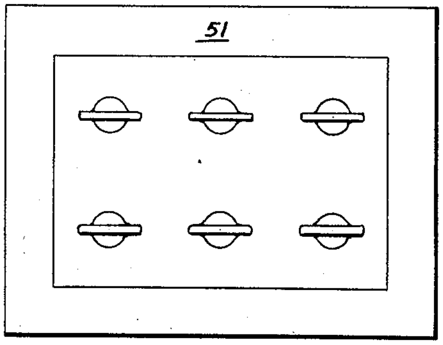
Fig. 11 is an end view of the embodiment of Fig. 10.

Figures 10 and 11 are a longitudinal section and an end view, respectively, of an embodiment in which a plurality of leads are sealed with glass-bonded mica into a large flanged sleeve 51. This sleeve may be rectangular as shown, cylindrical, oval, or of any other convenient shape; the leads may be disposed therein in rows, circles, or other suitable configuration.

Figure 12:
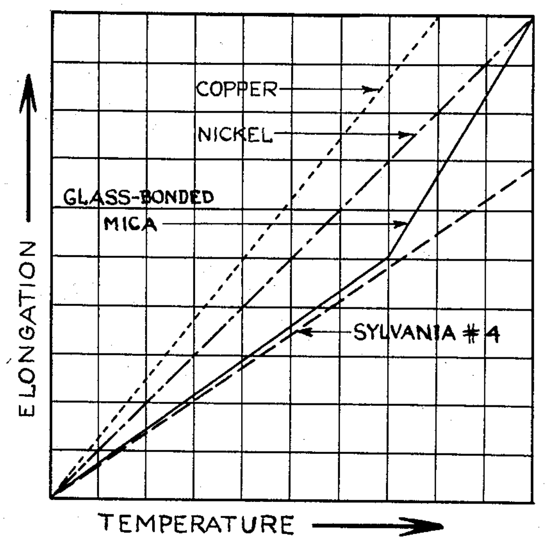
Fig. 12 is a graph comparing the thermal expansion of glass and metal.

Turning now to Figure 12, there are shown relative curves of thermal expansion for various materials. The glass-bonded mica used for the seal of the present invention has an average coefficient of thermal expansion of about $100 \times 10^{-7}$ per degree centigrade; Sylvania #4, one of the metals of the leads, has an average coefficient between 96 and $102 \times^{-7}$. However, in the higher temperatures where the binder is still fluid, the rate of expansion of glass-bonded mica is markedly higher than that of the metal. This means that as the assembly cools, the insulating material shrinks onto the center pin, thus producing good adhesion and a tight seal. At approximately the strain-point of the solidifying binder, the two curves approach each other and descend at approximately the same slope, that of the insulating material being only slightly higher than that of the pin metal, whereby a slight tension is maintained, but insufficient to unduly strain the relatively brittle glass-bonded mica. Steel and stainless steel have also been successfully used as pin metals.

Two metals are graphed in Figure 12 as examples of materials which may be selected for the eyelet or sleeve. Nickel is shown as having a higher rate of expansion than the insulating material; its average coefficient is about $133 \times 10^{-7}$. As the structure cools, a nickel sleeve will shrink onto the insulating material, compressing it, adhering tightly, and resulting in a good seal. The expansion rate of nickel is not sufficiently higher than that of the insulation to set up undue strain, the nickel being ductile enough to yield a little as it contracts on the solidifying glass-bonded mica.

Copper is shown as having a higher rate of expansion than nickel, its average coefficient being about $165 \times 10^{-7}$. It has, however, proven very satisfactory as a sleeve material, being even more ductile than nickel, and tending to yield more, resulting in an equally successful product. Brass, aluminum, and silver have also produced satisfactory results, as will any sufficiently ductile metal.

The temperature of firing during assembly of the electrode unit when using natural mica in the insulating material, within the range of about 1210° F. to 1230° F., and preferably at about 1220° F., has been carefully selected to produce a minute degree of calcination of the mica, when heating is continued for a time between about 20 seconds and 1 minute, and preferably about 35 seconds. This process causes the binder to be most fluid adjacent the metal parts, giving good wetting, and the slight calcination produces a slightly cellular or vesicular structure of the insulating material, without introducing porosity; in conditions of thermal shock or thermal expansion during use, this cellular character of the glass-bonded mica allows compression of the gas bubbles, thus relieving strains which would otherwise be transmitted to the structure as a whole, perhaps causing the insulation to crack, break free from its bond with the metal, or otherwise fail of perfect sealing. It is to preserve this cellular character during manufacturing that a constant-volume, or flash-type, mold and relatively low pressure are used to compress the electrode structure, rather than a positive entry, or follower type, of mold.

Synthetic mica calcines at a temperature about 300° F. higher than that of natural mica, allowing the use of a glassy bonding agent resistant to higher temperatures. In this case, heating at assembly is continued for a longer time, or a hotter flame is used, so that the same degree of fluidity of the binder and calcination of the synthetic mica may be attained.

As a variant of the foregoing procedures, it is also possible to position the sleeve and pin in a mold, fill the sleeve chamber with glass-bonded mica by injection molding, then reheat the sleeve and pin by torch, induction, or other convenient means, to a temperature at which they will be wetted by the insulating composition and at which slight calcination is induced, and restrike as already described. Still another variation is to use an injection mold in three sections, the center section containing the sleeve beting kept at a temperature high enough that the sleeve will be wetted by glass-bonded mica, and the top and bottom sections being cooler so that the molds will not be wetted where they are exposed to the insulating composition; in this case, the pin may be heated by electrical resistance after closing the mold and just before injecting the molten compound.

Although the invention has been illustrated by several specific embodiments thereof, and several methods of making them, such description is intended only as illustration of the invention, and it is not intended to limit it thereby. Various other compositions than those specifically set forth herein may be used. Other low melting binders may be used, and the proportions of binder to mica may vary within wide limits. Various shapes of sleeves, pins, and the like may be employed, and the metals may be other than those particularly set forth herein. Not only may the form, size, and configuration of the several parts be substantially changed, but other means for anchoring them together may be used. Terminal structures of this type may be applied to various electrical apparatus, and the uses thereof are not limited to the purposes enumerated herein.

From the foregoing, it will be apparent that the invention is broad and comprehensive, and is not to be limited except by the character of the claims appended hereto.

What is claimed is:

1. The method of making an electrode structure comprising assembling an elongated metallic conductor and a thin-walled surrounding sleeve of ductile metal with a bead of glass-bonded mica therebetween, heating said assembly for such time and at such temperature that the binder of said bead becomes plastic to wet said conductor and sleeve and to partially drive off the volatile constituent of said mica to produce a cellular structure in said bead, applying pressure to said plastic bead to compress it into sealing relation with said conductor and said sleeve, and cooling said assembly under pressure until said cellular bead freezes.

2. The method of making an electrode structure comprising assembling an elongated oxidized metallic conductor and a thin-walled surrounding oxidized metallic sleeve of ductile metal with a bead of glass-bonded mica therebetween, heating said assembly for such time and at such temperature that the binder of said bead becomes plastic to wet said conductor and sleeve and to partially drive off the volatile constituent of said mica to produce a cellular structure in said bead, applying pressure to said plastic bead to compress it into sealing relation with said conductor and said sleeve, and cooling said assembly under pressure until said cellular bead freezes.

3. The method of making an electrode structure comprising oxidizing a chromium-containing conductor in an atmosphere of hydrogen containing substantially 5% water vapor for approximately twenty minutes at a temperature of about 2300° F., assembling said conductor with a surrounding copper sleeve with a bead of glass-bonded mica therebetween, heating said assembly to a temperature between 1210° F. and 1230° F. for a sufficient time to cause said sleeve to become oxidized and the binder of said bead to become plastic to wet said conductor and sleeve and to partially drive off the volatile constituent of said mica to produce a cellular structure in said bead, applying pressure between seven and fifteen pounds per square inch to said plastic bead to compress it into sealing relation with said conductor and said sleeve, and cooling said assembly under pressure until said cellular bead freezes.

4. The method of making an electrode structure comprising oxidizing a chromium-containing conductor in an atmosphere of hydrogen containing substantially 5% water vapor for approximately twenty minutes at a temperature of about 2300° F., assembling said conductor with a surrounding copper sleeve with a bead of glass-bonded synthetic mica therebetween, heating said assembly to a temperature between 1510° F. and 1530° F. for such a time as to cause said sleeve to become oxidized and the binder of said bead to become plastic and wet said conductor and said sleeve and to partially drive off the volatile constituent of said synthetic mica to produce a cellular structure in said bead, applying pressure to said plastic bead to compress it into sealing relation with said conductor and said sleeve, and cooling said assembly under pressure until said cellular bead freezes.

5. The method of making an electrode structure comprising mixing glass frit and pulverized mica, heating said mixture to a temperature between 900° F. and 1220° F. whereby said frit becomes plastic, injecting said molten mixture under pressure into a bead mold maintained at a temperature between 400° F. and 750° F., allowing said bead to cool under pressure to the temperature of the mold whereby it becomes frozen, assembling an oxidized metallic conductor and a surrounding metallic sleeve with said glass-bonded mica bead therebetween, heating said assembly for such a time and at such a temperature as to oxidize said sleeve and to cause the binder of said bead to become plastic and wet said conductor and said sleeve and to cause the volatile constituent of said mica to be partially driven off to produce a cellular structure in said bead, applying pressure to said plastic bead to compress it into sealing relation with said conductor and said sleeve, and cooling said assembly under pressure until said cellular bead freezes.

6. A method of making an electrode structure, comprising assembling an elongated metallic conductor and a surrounding metallic sleeve having a coefficient of expansion higher than that of said conductor with a bead of glass-bonded mica therebetween, said glass-bonded mica having a coefficient of expansion markedly higher than that of said conductor at temperatures above the strain-point of the glass-bonded mica and approaching the coefficient of said conductor at temperatures below said strain-point, heating said assembly for such a time and at such a temperature to cause the binder of said bead to become plastic and wet said conductor and sleeve and to partially drive off the volatile constituent of said mica to produce a cellular structure in said bead, applying pressure to said plastic bead to compress it into sealing relation with said conductor and said sleeve, and cooling said assembly under pressure until said cellular bead freezes.

7. A method of making an electrode structure, comprising assembling an elongated metallic conductor and a surrounding metallic sleeve having a coefficient of expansion higher than that of said conductor with a bead of glass-bonded mica therebetween, said glass-bonded mica having a coefficient of expansion lower than that of said sleeve but markedly higher than that of said conductor at temperatures above the strain-point of the glass-bonded mica and approaching the coefficient of said conductor at temperatures below said strain-point, heating said assembly for such a time and at such a temperature to cause the binder of said bead to become plastic and wet said conductor and sleeve and to partially drive off the volatile constituent of said mica to produce a cellular structure in said bead, applying pressure to said plastic bead to compress it into sealing relation with said conductor and said sleeve, and cooling said assembly under pressure until said cellular bead freezes.

(References on following page)

References Cited in the file of this patent

UNITED STATES PATENTS

| | | |
|---|---|---|
| 732,812 | Anderson | July 7, 1903 |
| 1,888,071 | Case | Nov. 15, 1932 |
| 1,974,298 | Case | Sept. 18, 1934 |
| 2,032,239 | Wedlock | Feb. 25, 1936 |
| 2,100,187 | Handrek | Nov. 23, 1937 |
| 2,299,750 | Hull et al. | Oct. 27, 1942 |
| 2,318,435 | Stupakoff et al. | May 4, 1943 |
| 2,345,278 | Monack | Mar. 28, 1944 |
| 2,400,337 | Bruechner | May 14, 1946 |
| 2,429,955 | Goldsmith | Oct. 28, 1947 |
| 2,502,855 | Kingston | Apr. 4, 1950 |
| 2,632,431 | Suter | Mar. 24, 1953 |